(12) United States Patent
Turner

(10) Patent No.: US 7,753,000 B1
(45) Date of Patent: Jul. 13, 2010

(54) CONTROLLED HAY FEEDER

(75) Inventor: Julie Turner, Adel, IA (US)

(73) Assignee: Julie A. Turner, Adel, IA (US)

( * ) Notice: Subject to any disclaimer, the term of this patent is extended or adjusted under 35 U.S.C. 154(b) by 224 days.

(21) Appl. No.: 11/517,226

(22) Filed: Sep. 8, 2006

(51) Int. Cl.
*A01K 5/00* (2006.01)

(52) U.S. Cl. ........................ 119/61.2; 119/60; 119/61.3; 119/61.5; 119/61.1; 119/57; 221/244; 220/578; 222/205; 222/405; 222/386; 43/102

(58) Field of Classification Search .................... 119/73, 119/60, 61.2, 61.3, 61.5, 58, 61.1, 57; 221/244; 220/578; 222/205, 405, 386; 43/102
See application file for complete search history.

(56) References Cited

U.S. PATENT DOCUMENTS

| | | | |
|---|---|---|---|
| 23,386 A | 3/1859 | Packer | |
| 54,005 A | 4/1866 | Moore | |
| 195,351 A | 9/1877 | Crabb | |
| 376,529 A * | 1/1888 | Kline ........................... | 119/60 |
| 405,260 A | 6/1889 | Jacobs | |
| 492,473 A | 2/1893 | Reid | |
| 564,788 A | 7/1896 | Hermany et al. | |
| 727,925 A | 5/1903 | Faulkner | |
| 763,951 A | 7/1904 | Bethea | |
| 1,018,095 A | 2/1912 | Brown | |
| 1,065,823 A * | 6/1913 | Matthews ...................... | 222/205 |
| 1,089,011 A * | 3/1914 | Ruggles ....................... | 119/61.3 |
| 1,887,681 A * | 11/1932 | Harris ........................... | 119/73 |
| 3,589,340 A * | 6/1971 | Beliles ....................... | 119/61.54 |
| 3,776,193 A * | 12/1973 | Post, Sr. ....................... | 119/51.5 |
| 4,294,197 A * | 10/1981 | Snel et al. ....................... | 119/60 |
| 4,948,078 A * | 8/1990 | Dumenigo ................ | 248/176.1 |
| 5,377,621 A * | 1/1995 | Camm ....................... | 119/61.54 |
| 5,509,377 A | 4/1996 | Franklin | |
| 5,887,544 A * | 3/1999 | Popelier ................... | 119/61.54 |
| 6,431,117 B1 | 8/2002 | Rauch | |
| 6,497,195 B1 | 12/2002 | Beyers | |
| 7,090,092 B1 * | 8/2006 | Roebuck et al. .............. | 220/629 |
| 2005/0000460 A1 * | 1/2005 | Hansen ......................... | 119/57 |

FOREIGN PATENT DOCUMENTS

GB 2046583 A * 11/1980

* cited by examiner

*Primary Examiner*—Timothy D Collins
*Assistant Examiner*—Justin Benedik

(57) ABSTRACT

A hay feeder allows a horse to eat from the feeder at a controlled speed in order to help prevent choke as well as overeating. The feeder uses a receptacle that has one or more guide posts extending between a closed bottom and an open top. A plate has first openings that each receive a respective post in order to allow the plate to slide up and down within the receptacle, the plate also having a series of second openings. Hay is placed into the receptacle and the plate is positioned on top of the hay. The horse eats the hay through the series of second openings and the plate gravitationally falls with the depleting stock of hay guided downwardly along the posts.

4 Claims, 5 Drawing Sheets

CONTROLLED HAY FEEDER

BACKGROUND OF THE INVENTION

1. Field of the Invention

The present invention relates to a hay feeder for horses that controls the speed at which the horse eats the hay from the hay feeder.

2. Background of the Prior Art

While many horses are allowed to graze at pasture, others horses are fed in a stall or other location. Some pastured horses must also be stall fed during the times of year when the pasture is barren of food or otherwise covered in snow and ice or when the weather is otherwise uncooperative with pasture feeding. A common food choice for stall fed horses is hay, sometimes mixed with other nutrients such as vitamins. One of the problems experienced by many horse owners who stall feed the horse, is that the horse eats too fast. Eating too fast can result in "choke" or esophageal obstruction in the horse an unpleasant and potentially harmful side effect.

Additionally, many horses that are stall fed tend to consume too much hay, especially if the horse is eating the hay too fast. Aside from the cost of the breeding stock, the majority of the cost of owning a horse is usually the feed given to the horse. A normal horse eats on the order of between 2-3 percent of the horse's weight in dry weight equivalent feed. Allowing a horse to eat too much is not only wasteful and expensive, it can also cause labored breathing in the horse as well as lack of stamina. While rationing the hay to a horse can reduce the problem of overeating, this is not always possible, especially in a multiple horse setting.

Devices have been proposed that attempt to control the speed with which the horse consumes hay in order to prevent both choke and overeating. Such devices, which work with varying degrees of effectiveness, tend to be complex in design and construction, making such devices expensive to manufacture, obtain and maintain. Some prior all devices, especially those that rely on springs for their proper functioning, have the potential to cause injury to the animal during use.

Accordingly, there exists a need in the art for a device that helps control the speed with which a horse consumes hay in a stall or other non-pasture setting in order to help prevent choke as well as overeating with their attendant problems. Such a device must be simple in design and construction and be easy to use and maintain. Such a device must have minimal potential for causing injury to the horse and owner alike.

SUMMARY OF THE INVENTION

The controlled hay feeder of the present invention addresses the aforementioned needs in the art by providing a feeding device that controls the speed which a horse consumes hay from the controlled hay feeder in order to help prevent choke as well as overeating with its attendant problems of labored breathing and lack of stamina in the horse. The controlled hay feeder is of simple in design and construction and is easy to use and maintain. The controlled hay feeder does not rely on springs for its proper functioning and has but minimal potential for causing injury to the horse and owner alike.

The controlled hay feeder of the present invention is comprised of a receptacle that has a closed bottom, an open top, and an inner surface. One or more guide posts are positioned against the inner surface of the receptacle and extend between the bottom and the top of the receptacle. A plate has at least one first opening, each first opening receiving a respective one of the guide posts, the plate also having a plurality of second openings. The plate is received within the receptacle and capable of sliding along the guide posts. At least one cap is provided and each is removably attached to an end of a respective one of the guide posts, the end proximate the top of the receptacle. A handle may be attached to the receptacle. A plug is located on the bottom or side of the receptacle. A compartment (false bottom) may be located at the bottom of the receptacle and has a plug located thereon. Each of the second openings is between about 3 inches and about 3.5 inches in diameter.

BRIEF DESCRIPTION OF THE DRAWINGS

Similar reference numerals refer to similar parts throughout the several views of the drawings.

DESCRIPTION OF THE PREFERRED EMBODIMENT

Figure 1:
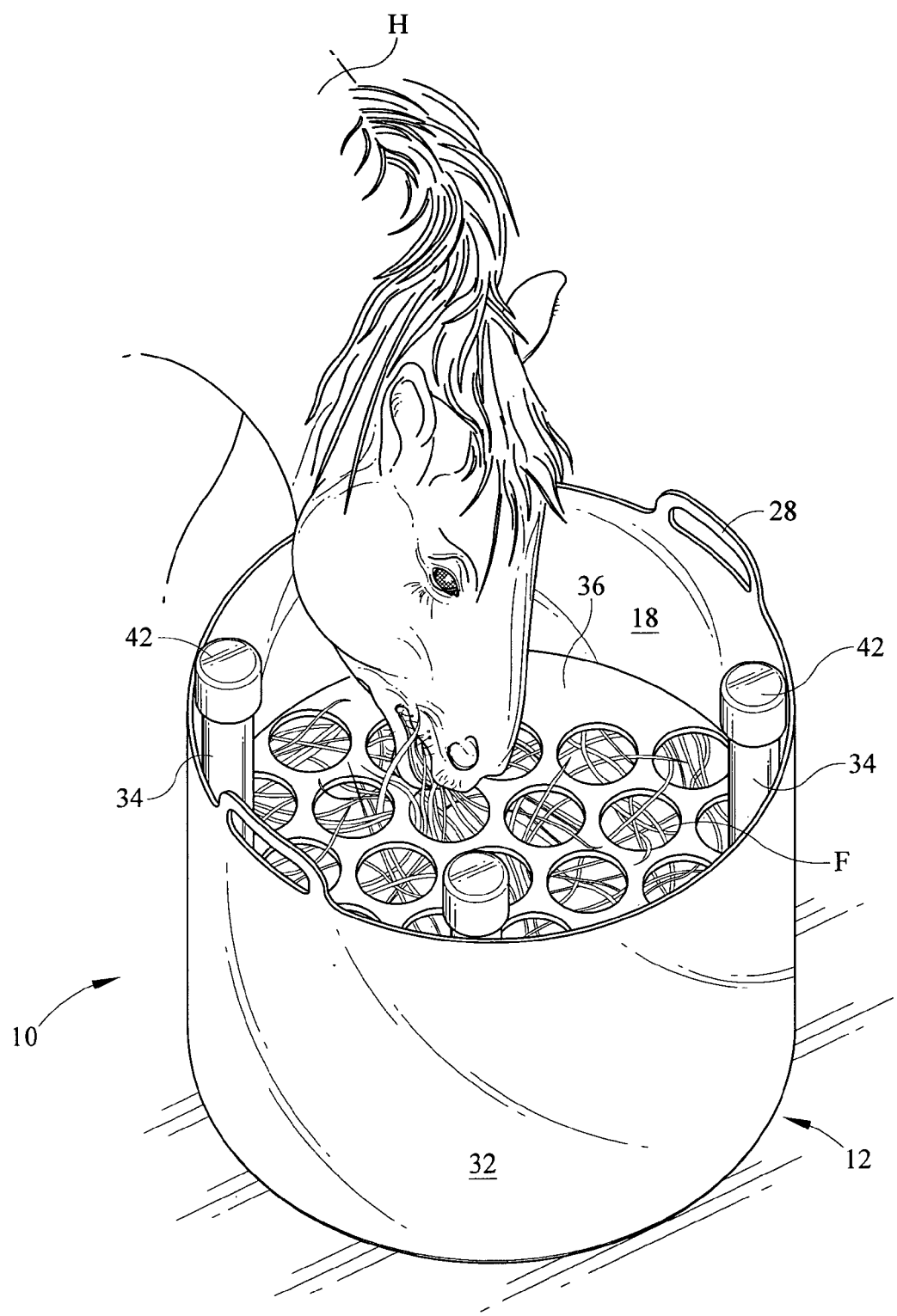
FIG. 1 is a perspective view of the controlled hay feeder of the present invention being used to feed a horse.
Figure 2:
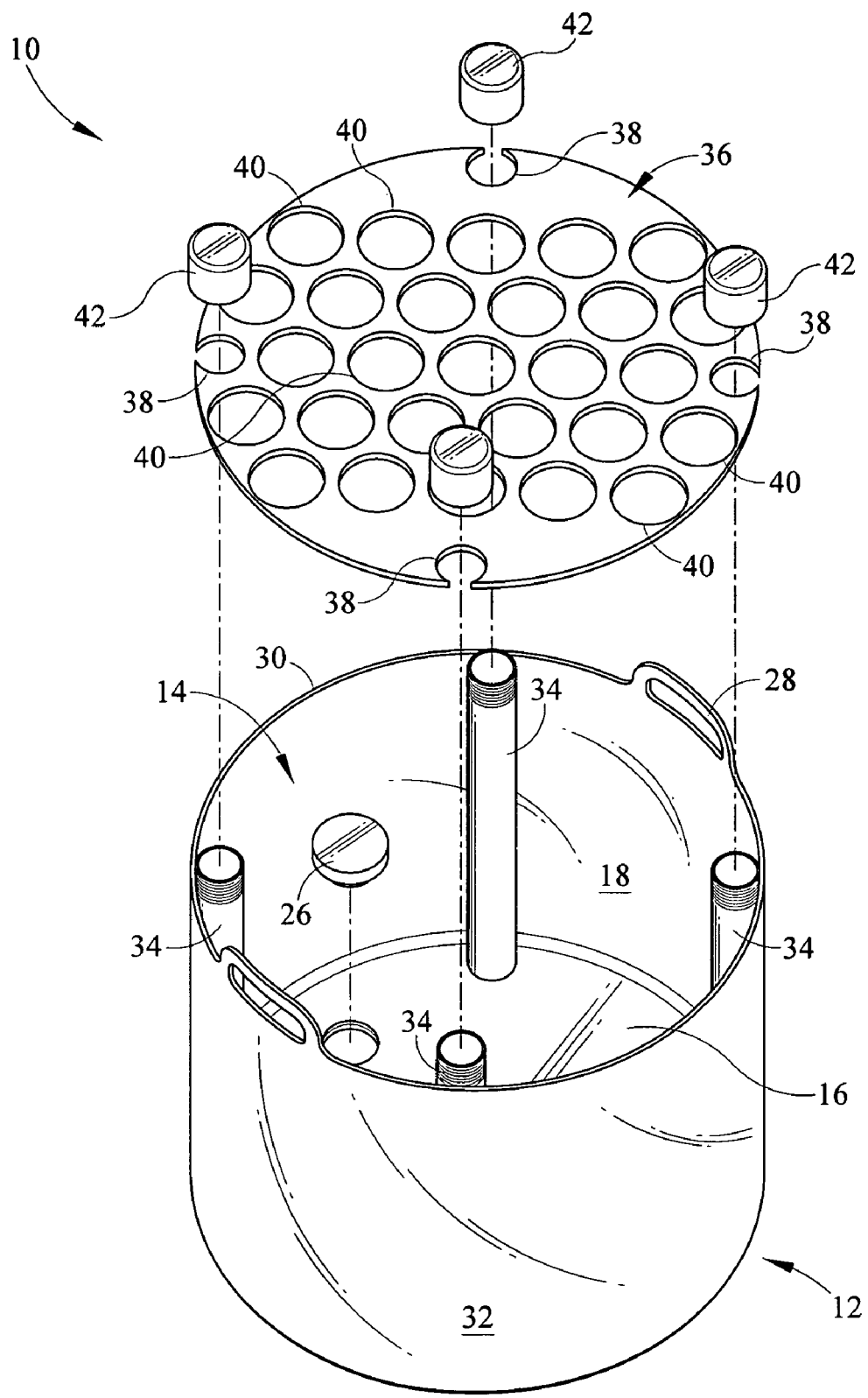
FIG. 2 is an exploded perspective view of the controller hay feeder.
Figure 3:
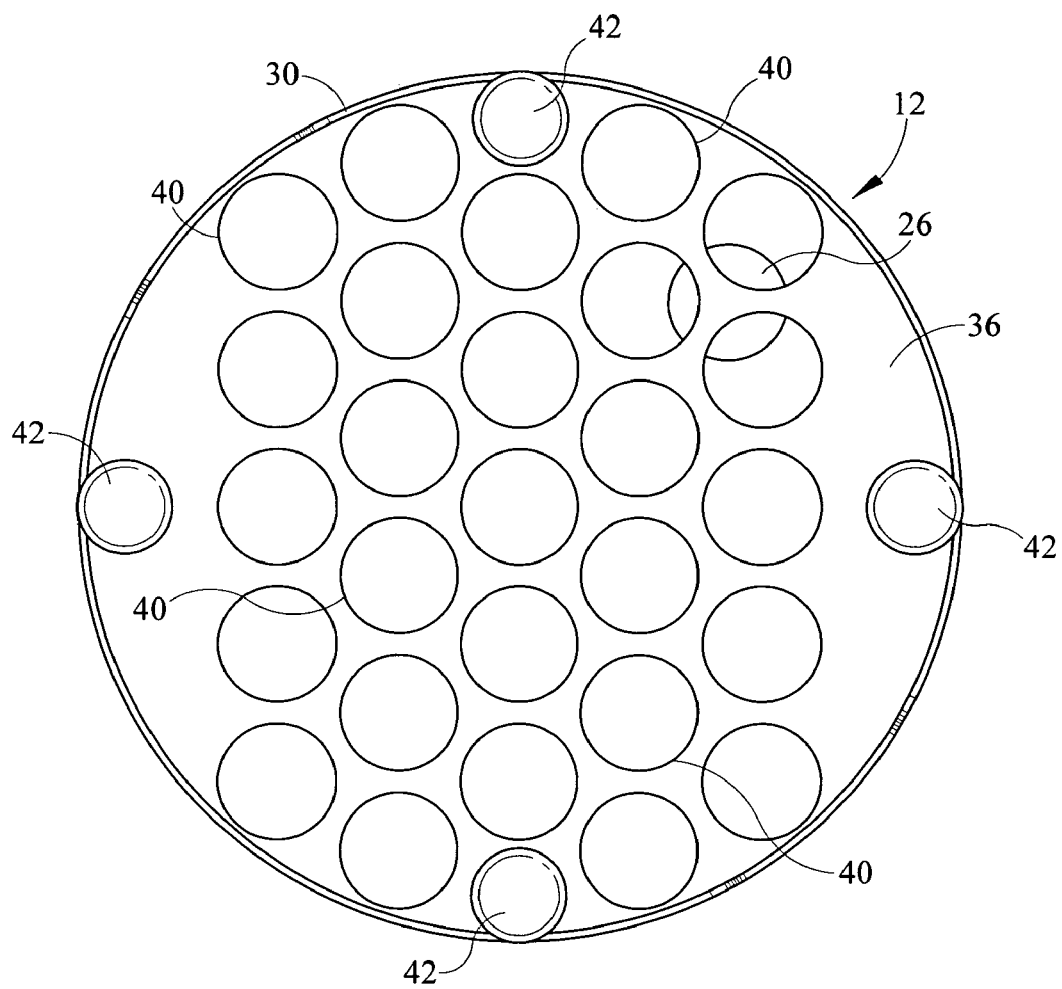
FIG. 3 is a top plan view of the controlled hay feeder.
Figure 4:
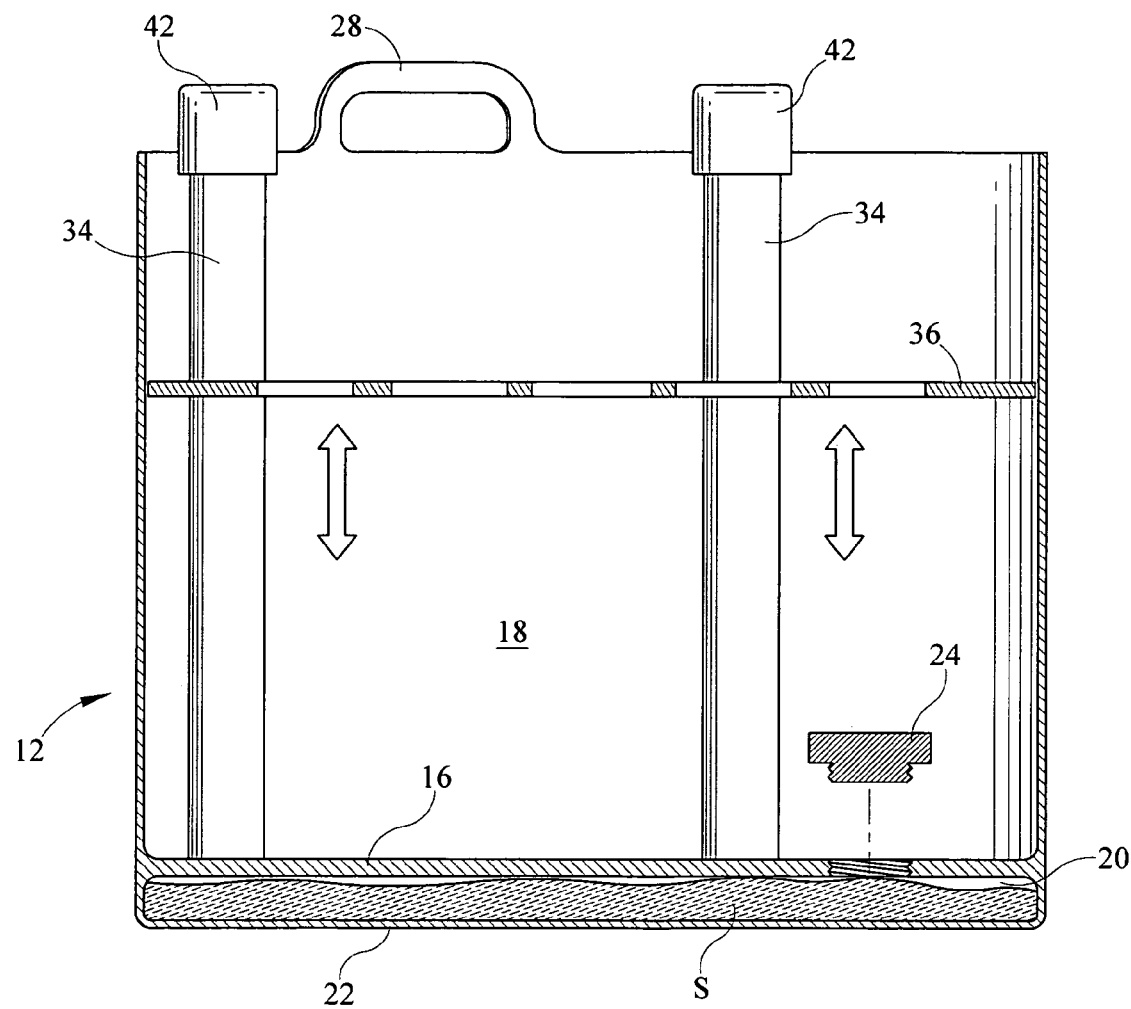
FIG. 4 is a sectioned view of the controlled hay feeder.
Figure 5:
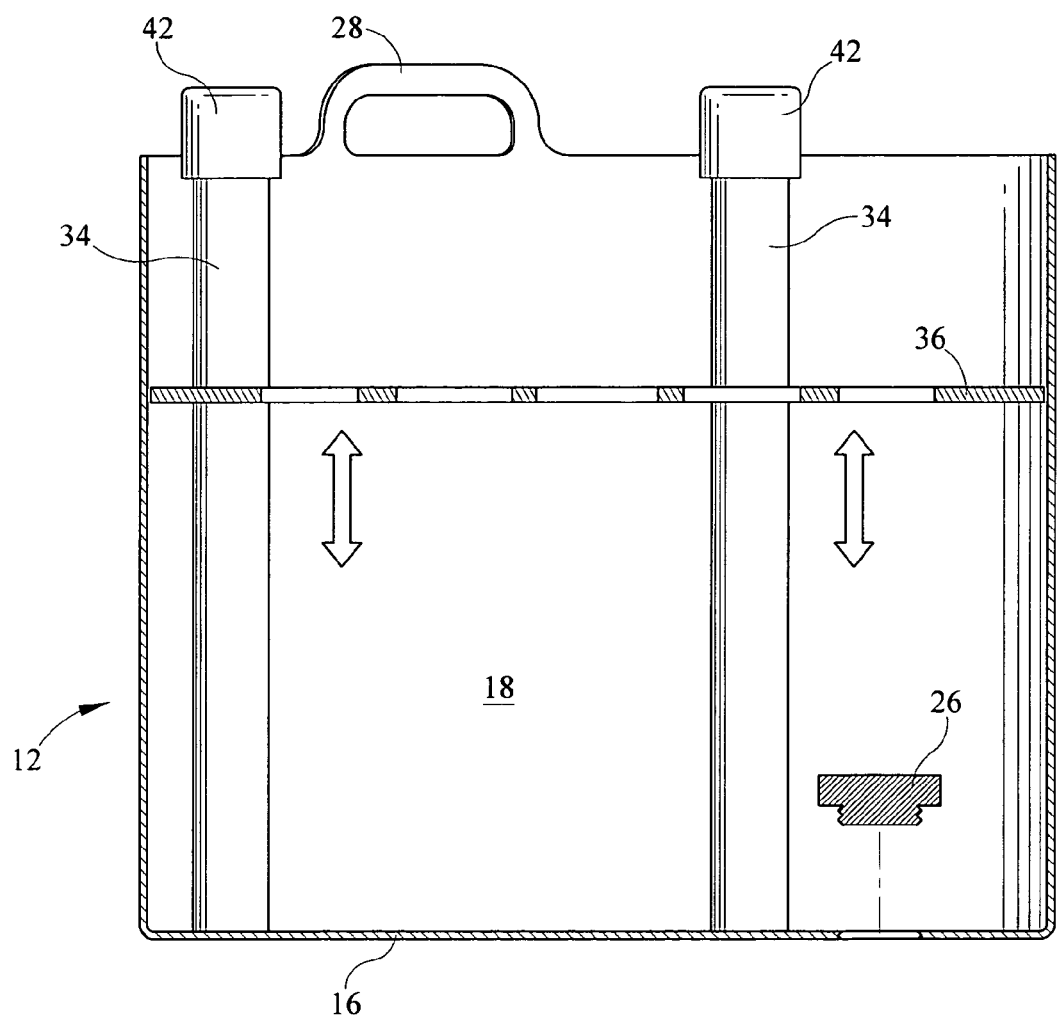
FIG. 5 is a sectioned view of an alternate embodiment of the controlled hay feeder of the present invention.

Referring now to the drawings, it is seen that the controlled hay feeder of the present invention, generally denoted by reference numeral 10, is comprised of receptacle 12 that has an open top 14, a closed bottom 16, and an inner surface 18. As seen in FIG. 4, the bottom 16 may have an additional compartment 20 such that an additional wall 22 is provided to give the bottom a "false bottom." A plug 24 is removably attached, threadably or otherwise, to the bottom 16, or to this additional wall 22, or to the side of the receptacle (neither illustrated) in order to gain access to the compartment 20. The compartment can be filled with sand S or other appropriate substance in order to help prevent the controlled hay feeder 10 from tipping over during use. Alternately, as seen in FIG. 5, no compartment is present and the bottom 16 is the sole bottom wall of the receptacle 12. A plug 26 is removably attached, threadably or otherwise, in order to allow the receptacle to be drained as needed, the plug 26 being accessible either through the inside of the receptacle 12 as shown, or from the underside, although the plug can be side mounted.

A handle 28 may be attached to the receptacle 12 at any appropriate location such as extending from the upper rim 30 of the receptacle 12, attached to the outer surface 32 of the receptacle 12, etc. The handle 28 may be monolithic with the receptacle 12 or may be a separate unit appropriately attached to the receptacle 12.

The receptacle 12 is made from any appropriate material such as metal or plastic. The receptacle 12 may have any appropriate shape such as the illustrated cylindrical shape or square shape, etc.

One or more guide posts 34 are provided and extend between the closed bottom 16 and the open top 14 of the receptacle 12 and are secured to the inner surface 18 of the receptacle 12. The guide posts 34 are parallel with one another. The guide posts 34 can be made from any appropriate material such as metal or PVC.

A generally flat plate 36 is provided and has one or more first openings 38 thereon such that the plate 36 is positioned within the receptacle 12 such that each of the first openings 38 receives a respective one of the guide posts 34. The plate 36 is capable of sliding up and down within the receptacle 12 along the guide posts 34. Although a single guide post 34 can provide sufficient guidance for the plate 36 during up and down sliding, the use of multiple guide posts 34 provides additional stability for the sliding plate 36 with the use of either 3 or 4 guide posts 34 providing substantial stability for the plate 36 depending on the size and shape of the receptacle 12 and the corresponding plate 36. The plate 36, which can be made from the same material as that of the receptacle 12, is shaped to match the shape of the inside of the receptacle 12 and is sized to be slightly smaller than the inside diameter of the receptacle 12. A series of second openings 40 are located on the plate 36 with each sized to be between about 3.0-3.5 inches in diameter, although sizes outside of this range may prove satisfactory.

One or more end caps 42 are provided and each cap 42 sits on an end of a respective one of the guide posts 34, the end that is proximate the open top 14 of the receptacle 12.

In use, the controlled hay feeder 10 is filled with sand S or other appropriate ballast if the receptacle 12 has a false bottom compartment 20 and is filled with an appropriate amount of hay F, in flake form, flat side down, by removing the end caps 42 from their respective guide posts 34 and removing the plate 36 from the guide posts 34 and thus from the receptacle 12. The hay F is wetted if desired. After the desired amount of time, either the receptacle 12 is tipped in order to allow the water to run out thereby removing sugars, dirt and allergens, or the water is removed by removing the plug 26 from a single bottom 16 configuration receptacle 12 (or the side if side mounted). The plate 36 is positioned back onto the guide posts 34 and the end caps 42 are replaced onto the ends of the guide posts 34. The plate 36 sits atop the hay F within the receptacle 12. A horse H feeds from the controlled hay feeder 10 by pulling the hay F through the series of second openings 40 of the plate 36. As the hay F is depleted from the receptacle 12, the plate 36 gravitationally falls with the depleting hay F guided by the guide posts 34, so that the hay F is constantly at the second openings 40 allowing the horse H to retrieve the hay F. The use of the honeycomb scattered second openings 40 in an approximate 3.0-3.5 inch diameter simulates grazing allowing the horse H to eat in a slower fashion, thereby stretching the feeding time and decreasing the amount of hay F consumed as well as reducing the possibility of choke.

While the invention has been particularly shown and described with reference to an embodiment thereof, it will be appreciated by those skilled in the art that various changes in form and detail may be made without departing from the spirit and scope of the invention.

I claim:

1. A feeder comprising;

A substantially cylindrical shaped receptacle having a closed bottom, an open top and an inner sidewall extending vertically between the closed bottom and the open top surface, the receptacle having a quantity of livestock feed therein;

At least two generally circular guide posts positioned against the inner sidewall surface of the receptacle and extending between the bottom and the top the guide posts being positioned against the inner surface along its entire extension between the top and the bottom the guide posts fixedly attached to the closed bottom of the receptacle, said guide posts terminating at the top with threaded caps;

A plate having first openings that have a generally circular shape that correspond to the shape of each guide post and that receives each guide post such that the first openings partially encircle each post and such that the posts do not pivotally interact with the plate, the plate only partially encircling the guide posts, and the plate having a plurality of second openings, the plate received within the receptacle such that the plate is supported solely atop the feed, the feed being disposed between the bottom and the plate with some of the feed retrievable through the second openings and such that the plate slides gravitationally downwardly toward the bottom under the weight of the plate as feed is depleted from the receptacle whenever the bottom rests upon a ground surface such that the open top is facing in a gravitationally upward direction with the plate guided downwardly toward the bottom via the openings sliding along the guide posts, said plate being attached to said guide posts when the caps are threaded upon said posts, and the plate being removable from receptacle when the caps are removed;

A compartment located at the bottom of the receptacle, the compartment including a threaded opening for insertion of a ballast material and said opening sealed with a threaded plug when in use.

2. The feeder as in claim 1 further comprising a handle attached to the receptacle.

3. The feeder as in claim 1 wherein each of the second openings is between about 3 inches and about 3.5 inches in diameter.

4. The feeder as in claim 1 wherein the number of guide posts is three such that the guide posts are equidistantly spaced with one another along the closed bottom of the receptacle.

\* \* \* \* \*